(12) United States Patent
Rodriguez et al.

(10) Patent No.: US 7,984,018 B2
(45) Date of Patent: Jul. 19, 2011

(54) EFFICIENT POINT-TO-MULTIPOINT DATA RECONCILIATION

(75) Inventors: Pablo Rodriguez, Cambridge (GB); Julian Chesterfield, Cambridge (GB)

(73) Assignee: Microsoft Corporation, Redmond, WA (US)

( * ) Notice: Subject to any disclaimer, the term of this patent is extended or adjusted under 35 U.S.C. 154(b) by 640 days.

(21) Appl. No.: 11/109,011

(22) Filed: Apr. 18, 2005

(65) Prior Publication Data

US 2006/0235895 A1    Oct. 19, 2006

(51) Int. Cl.
*G06F 7/00* (2006.01)
*G06F 17/00* (2006.01)
(52) U.S. Cl. ......... 707/625; 707/624; 707/634; 711/216
(58) Field of Classification Search .................... 711/216
See application file for complete search history.

(56) References Cited

U.S. PATENT DOCUMENTS

| | | | | |
|---|---|---|---|---|
| 4,538,240 | A * | 8/1985 | Carter et al. | 708/492 |
| 5,199,073 | A * | 3/1993 | Scott | 711/216 |
| 5,390,187 | A * | 2/1995 | Stallmo | 714/7 |
| 5,475,826 | A * | 12/1995 | Fischer | 707/1 |
| 5,530,757 | A * | 6/1996 | Krawczyk | 713/188 |
| 5,694,569 | A * | 12/1997 | Fischer | 711/216 |
| 5,701,418 | A * | 12/1997 | Luitje | 709/245 |
| 5,909,700 | A * | 6/1999 | Bitner et al. | 711/162 |
| 6,148,382 | A * | 11/2000 | Bitner et al. | 711/162 |
| 6,202,135 | B1 * | 3/2001 | Kedem et al. | 711/162 |
| 6,233,589 | B1 * | 5/2001 | Balcha et al. | 707/625 |
| 6,397,309 | B2 * | 5/2002 | Kedem et al. | 711/162 |
| 6,850,969 | B2 * | 2/2005 | Ladan-Mozes et al. | 709/213 |

(Continued)

OTHER PUBLICATIONS

"Low cost comparisons of file copies"; Schwarz, T.; Bowdidge, R.W.; Burkhard, W.A.;Distributed Computing Systems, 1990. Proceedings., 10th International Conference on May 28-Jun. 1, 1990 pp. 196-202; Digital Object Identifier 10.1109/ICDCS.1990.89272.*

(Continued)

*Primary Examiner* — Tim T. Vo
*Assistant Examiner* — Garrett Smith
(74) *Attorney, Agent, or Firm* — L. Alan Collins; Collins & Collins Incorporated

(57) ABSTRACT

Efficient reconciliation of different versions of a target file or dataset can be facilitated using a hash hierarchy of a master version of the dataset. Each level of the hash hierarchy has hashes of blocks of the master version that may be sub-blocks of the hashes in the level above. The top level of the hash hierarchy, having the hashes of the largest blocks of the master, may be transmitted on a first communication channel, possibly a one-way or broadcast communication channel. Streams of encodings of each lower level of the hash hierarchy may be transmitted on respective communication channels. The encodings for a level of the hierarchy may be combinations, such as random linear combinations, of the hashes of that level. A receiver with a target dataset can receive the top level hashes from the first channel and use them to determine which lower hashes are needed to identify parts of the master missing from the target. The encodings can be used to help obtain needed lower level hashes that can be used to more finely identify missing parts. Different receivers may not have to wait for a particular piece of information about the master. Rather, any received information (e.g. encoding) about the master will most likely allow any receiver to advance its understanding of the master dataset. Receivers will usually not have to wait for delivery of a particular hash in the hierarchy.

20 Claims, 14 Drawing Sheets

U.S. PATENT DOCUMENTS

| | | | |
|---|---|---|---|
| 2001/0037323 A1* | 11/2001 | Moulton et al. | 707/1 |
| 2001/0042222 A1* | 11/2001 | Kedem et al. | 714/6 |
| 2002/0055991 A1* | 5/2002 | Arrouye et al. | 709/220 |
| 2003/0182568 A1* | 9/2003 | Snapp et al. | 713/193 |
| 2003/0217058 A1* | 11/2003 | Ladan-Mozes et al. | 707/8 |

OTHER PUBLICATIONS

"Multilevel error-control codes for data storage channels"; Abdel-Ghaffar, K.A.S.; Hassner, M.; Information Theory, IEEE Transactions on vol. 37, Issue 3, Part 2, May 1991 pp. 735-741; Digital Object Identifier 10.1109/18.79944.*

"Software-based erasure codes for scalable distributed storage"; Cooley, J.A.; Mineweaser, J.L.; Servi, L.D.; Tsung, E.T.;Mass Storage Systems and Technologies, 2003. (MSST 2003). Proceedings. 20th IEEE/11th NASA Goddard Conference on Apr. 7-10, 2003 pp. 157-164.*

"Improved single-round protocols for remote file synchronization"; Irmak, U.; Mihaylov, S.; Suel, T.;INFOCOM 2005. 24th Annual Joint Conference of the IEEE Computer and Communications Societies. Proceedings IEEE vol. 3, Mar. 13-17, 2005 pp. 1665-1676 vol. 3; Digital Object Identifier 10.1109/INFCOM.2005.1498448.*

"Shift-register synthesis and BCH decoding"; Massey, J.; Information Theory, IEEE Transactions on vol. 15, Issue 1, Jan. 1969 pp. 122-127.*

Julian Chesterfield and Pablo Rodriguez; "DeltaCast: Efficient File Reconciliation in Wireless Broadcast Systems" Jun. 2005—Proceedings of the Third International Conference on Mobile Systems, Applications, and Services (MobiSys 2005) (1931971315); Berkley, CA; Seattle, WA USA; 14 pages.

Q. L. Hu, D.L. Lee, and W.C. Lee; Performance evaluation of a wireless hierarchical data dissemination system., In Proceedings of the 5th Annual ACM International Conference on Mobile Computing and Networking (MobiCom99), Seattle, WA, Aug. 1999.

S. Acharya, R. Alonso, M. Franklin, and S. Zdonik. Broadcast disks: Data management for asymmetric communications environments., In Proceeding of ACM SIGMOD Conference on Management of Data, San Jose, CA, May 1995.

T. Imielinski, S. Viswanathan, and B.R. Badrinath. Data on air Organization and access., IEEE Transactions on Knowledge and Data Engineering (TKDE), May/Jun. 1997.

StarBand., http://www.starband.com/.

Hughes Network Systems., http://www.direcway.com/.

Multimedia Broadcast/Multicast System (MBMS), http://www.3gpp2.org/ftp/Specs/html-info/29846.htm.

Broadcast and Multicast Service in cdma2000 Wireless IP Network., http://www.3gpp2.org/, Oct. 2003.

Digital Audio and Video Broadcasting systems, http://www.etsi.org/.

First UK user trial of multi-channel TV to mobile phones, Nokia Press Release, IBC Amsterdam, 2004.

DirectBand Network. Microsoft Smart Personal Objects Technology (SPOT). http://www.microsoft.com/resources/spot/.

A. Tridgell and P. MacKerras, The rsync algorithm, Technical Report TR-CS-96-05, Australian National University, Jun. 1996.

N. Baric and B. Pfitzmann, Collision-free accumulators and fail-stop signature schemes without trees, Advance in Cryptology, EUROCRYPT 97, 1997.

M. Bellare and D. Micciancio, A new paradigm for collision-free hashing: Incrementality at reduced cost, Advances in Cryptology, EUROCRYPT 97, 1997.

R. Johnson, D. Molnar, D. Song, and D. Wagner, Homomorphic signature schemes, Progress in Cryptology CT-RSA 2002, 2002.

T. Schwarz, R., Bowbidge, and W. Burkhard, Low cost comparison of File copies, Proc. of the 10th Int. Conf. on Distributed Computing Systems, 1990, pp. 196202.

Zdelta Home Page, http://cis.poly.edu/zdelta/.

J. Byers and J. Considine, Informed Content Delivery Across Adaptive Overlay Networks, Proc. of ACM SIGCOMM, Aug. 2002.

G. Cormode, M. Paterson, S. Sahinalp, and U. Vishkin, Communication complexity of document exchange, Proc. of the ACM-SIAM Symp. on Discrete Algorithms, Jan. 2000.

G. Cormode, Sequence Distance Embeddings, Ph.D thesis, University of Warwick, Jan. 2003.

A. Orlitsky, Interactive communication of balanced distributions and of correlated files, SIAM Journal of Discrete Math, vol. 6, No. 4. pp. 548564, 1993.

A. Orlitsky, Worst-case interactive communication II: Two messages are not optimal, IEEE Transactions on Information Theory, vol. 37, No. 4, pp. 9951005, Jul. 1991.

A. Orlitsky and K. Viswanathan, One-way communication and error-correcting codes, Proc. of the 2002 IEEE Int. Symp. on Information Theory, Jun. 2002 p. 394.

Y. Minsky, A. Trachtenberg, and R. Zippel, Set reconciliation with almost optimal communication complexity, Technical Report TR2000-1813, Cornell University, 2000.

D. Starobinski, A. Trachtenberg, and S. Agarwal, Efficient PDA synchronization, IEEE Trans. on Mobile Computing, 2003.

S. Agarwal, D. Starobinski, and A. Trachtenberg, On the scalability of data synchronization protocols for PDAs and mobile devices, IEEE Network Magazine, special issue on Scalability in Communication Networks, Jul. 2002.

R. Karp and M. Rabin, Efficient randomized pattern-matching algorithms, IBM Journal of Research and Development, vol. 31, No. 2, pp. 249260. 1987.

S. Rhea, K. Liang, and E. Brewer, Value-based web caching, Proc. of the 12th Int. World Wide Web Conference, May 2003.

N. Spring and D. Wetherall, A protocol independent technique for eliminating redundant network traffic, ACM SIGCOMM Conference, 2000.

A. Muthitacharoen, B. Chen, and D. Mazi'eres, A low bandwidth network file system, in Proc. of the 18th ACM Symp. on Operating Systems Principles, Oct. 2001, pp. 174187.

L. Cox, C. Murray, and B. Noble, Pastiche: Making backup cheap and easy, in Proc of the 5th Symp. on Operating Systems Design and Implementation, Dec. 2002.

Byers, John et al., "A Digital Fountain Approach to Reliable Distribution of Bulk Data", pp. 12.

Bellare, Mihir et al., "A New Paradigm for Collision-free Hashing: Incrementality at Reduced Cost", pp. 21.

Spring, Neil et al., "A Protocol-Independent Technique for Eliminating Redundant Network Traffic", pp. 9.

Acharya, Swarup et al., "Broadcast Disks: Data Management for Asymmetric Communication Environments", Technical Report No. CS-94-43 (Dec. 1994), pp. 28.

Baric, Niko et al., "Collision-Free Accumulators and Fail-Stop Signature Schemes Without Trees", Advances in Cryptology—EUROCRYPT '97, LNCS 1233, pp. 480-494.

Cormode, Graham et al., "Communication complexity of document exchange", pp. 17.

Imielinski, T., et al., "Data on Air: Organization and Access", IEEE Transactions on Knowledge and Data Engineering, Vol. 9, No. 3, May/Jun. 1997, pp. 353-372.

Shivakumar, N., et al., "Efficient indexing for broadcast based wireless systems", Mobile Networks and Applications 1 (1996), pp. 433-446.

Starobinski, D., et al., "Efficient PDA Synchronization", IEEE Transactions on Mobile Computing, vol. 2, No. 1, Jan.-Mar. 2003, pp. 40-51.

Karp, R., et al., "Efficient randomized pattern-matching algorithms", IBM J. Res. Develop. vol. 31 No. 2 Mar. 1987, pp. 249-260.

Xu, J., et al., "Exponential Index: A Parameterized Distributed Indexing Scheme for Data on Air", MobiSys'04, Jun. 6-9, 2004, pp. 153-164.

Irmak, U., et al., "Improved Single-Round Protocols for Remote File Synchronization", pp. 12.

Byers, J., et al., "Informed Content Delivery Across Adaptive Overlay Networks", pp. 12.

Orlitsky, Alon "Interactive Communication of Balanced Distributions and of Correlated Files", Siam J. Disc. Math. vol. 6, No. 4, Nov. 1993, pp. 548-564.

Schwarz, T., et al., "Low Cost Comparisons of File Copies", IEEE (1990), pp. 196-202.

Cox, Landon P., et al., "Pastiche: Making Backup Cheap and Easy", pp. 14.

Agarwal, S., et al., "On the Scalability of Data Synchronization Protocols for PDAs and Mobile Devices", pp. 14.

Orlitsky, A., et al., "One-Way Communication and Error-Correcting Codes", Correspondence, IEEE Transactions on Information Theory, vol. 49, No. 7, Jul. 2003, pp. 1781-1788.

Chen, Ming-Syan et al., "Optimizing Index Allocation for Sequential Data Broadcasting in Wireless Mobile Computing", IEEE Transactions on Knowledge and Data Engineering, vol. 15, No. 1, Jan./Feb. 2003, pp. 161-173.

Hu, Qingilong et al., "Performance Evaluation of a Wireless Hierarchical Data Dissemination System", Mobicom '99, pp. 163-173.

Cormode, Graham "Sequence Distance Embeddings", Thesis Submitted to the University of Warwick for the degree of Doctor of Philosophy, Computer Science, Jan. 2003, pp. 1-174.

Tridgell, Andrew et al., "The rsync algorithm", TR-CS-96-05, Jun. 18, 1996, pp. 1-6.

Rhea, Sean C., et al., "Value Based Web Caching", Proceedings of the Twelfth International World Wide Web Conference, May 2003, pp. 1-10.

Orlitsky, Alon "Worst-case Interactive Communication 11: Two Messages are Not Optimal", IEEE Transactions on Information Theory, vol. 37, No. 4, Jul. 1991, pp. 995-1005.

StarBand, http://www.starband.com/.

Hughes Network Systems, http://www.direcway.com/.

Multimedia Broadcast/Multicast System (MBMS), http://www.3gpp.org/ftp/Specs/html-info/29846.htm.

Broadcast and Multicast Service in cdma2000 Wireless IP Network, http://www.3gpp2.org/, Oct. 2003.

First UK user trial of multi-channel TV to mobile phones, Nokia Press Release, IBC Amsterdam, 2004. http://press.nokia.com/PR/200409/960284_5.html.

DirectBand Network. Microsoft Smart Personal Objects Technology (SPOT), http://www.microsoft.com/resources/spot/.

Johnson, R., et al., "Homomorphic Signature Schemes", Progress in Cryptology CT-RSA 2002, 2002, pp. 18.

Minsky, Y., et al., "Set Reconciliation with Nearly Optimal Communication Complexit", Technical Report TR2000-1813, Cornell University, Apr. 29, 2004, pp. 1-18.

Muthitacharoen, A., et al., "A low bandwidth network file system", In Proc. of the 18th ACM Symp. on Operating Systems Principles, Oct. 2001, pp. 14.

* cited by examiner

|  | DeltaCast | | | Hierarchical | | | Single Layer | | | Simple Download | | |
|---|---|---|---|---|---|---|---|---|---|---|---|---|
| Avg. Latency | 41.6 | 120.1 | 173.4 | 204.9 | 583.03 | 797.93 | 303.79 | 305.21 | 609 | 0 | 291.6 | 291.6 |
| Active Time | 41.6 | 120.1 | 173.4 | 41.6 | 120.1 | 161.7 | 303.79 | 62.9 | 366.69 | 0 | 291.6 | 291.6 |
| Data Download | 31.7 | 366.8 | 398.5 | 31.7 | 366.8 | 398.5 | 83.4 | 366.8 | 450.2 | 0 | 1780 | 1780 |
| Decoding Time | 0.4 | 11.6 | 12 | 0 | 0 | 0 | 0 | 0 | 0 | 0 | 0 | 0 |

EFFICIENT POINT-TO-MULTIPOINT DATA RECONCILIATION

TECHNICAL FIELD

This description relates generally to enabling efficient data reconciliation and more specifically to enabling efficient reconciliation of an outdated or modified version or copy of a master file or dataset.

BACKGROUND

There are many scenarios where data is mirrored, replicated, synchronized, etc. For example, different web servers may each serve an identical copy of a set of web pages. When a master of the set changes, the copies of the set need to be updated to match the master set. When a software package is revised, the latest revision may need to be propagated to a number of systems that distribute duplicate copies of the package. A news bulletin that changes frequently over time may need to be quickly updated on a number of clients, each of which may have a different outdated version of the news bulletin. Storage devices may also be synchronized. A network router may need to update other routers with a latest routing table. Any system providing a source or master dataset will be referred to as a sender and any system receiving difference or update information from a sender will be referred to as a receiver. A dataset can be any arbitrary type of data, such as a file, a file system directory, a set of one or more web pages, a BLOB, a data structure, etc.

In some cases, a receiver with a dataset that needs to be updated may send feedback to a sender indicating the differences between the receiver's dataset and the sender will use that feedback to provide the receiver with individually tailored update information that the receiver can use to update its version of the dataset to match the sender's master version of the dataset. However, in some situations it may be impractical or impossible for a receiver to provide a sender with clues or feedback about the particular data that the receiver needs to update its copy of the dataset. For example, if the sender is a server on a data network such as the Internet, the sender may not be able to handle the overhead needed to form individual bi-directional connections with a large number of clients (receivers); one-way broadcasting may be the only means of propagating update information to clients. If a one-way communication medium is being used, for example broadcast radio, then feedback will not be possible. Whether feedback is possible or not, and regardless of the application, there is a general need to minimize the amount of information that a receiver or client needs to receive in order to be able to compare or update its version of a corresponding file, dataset, table, data store, etc. There is also a need to minimize the bandwidth used to update multiple receivers. Minimizing the amount of delta or update information can conserve network bandwidth, reduce the active listening time of a wireless device, conserve battery energy, and reduce the time that it takes to bring a receiver's version up to date.

SUMMARY

The following summary is included only to introduce some concepts discussed in the Detailed Description below. This summary is not comprehensive and is not intended to delineate the scope of protectable subject matter.

One source, a sender, may enable updating at multiple receivers by sending each receiver the same update information. Any receiver can use the same update information to increase its knowledge about how its target dataset differs from the master dataset, even though its target dataset may uniquely differ from the master dataset. The master dataset may be divided into divisions and subdivisions, which may be hashed to form a hash hierarchy. The update information sent by the sender may include a top level of hashes of the hash hierarchy as well as encodings of the lower levels of the hash hierarchy and encodings of blocks of the content of the master dataset. The encodings may be erasure hashes, for example. An erasure hash may be computed, for example, as a random linear combination of the hashes of a given level of the hierarchy.

Any receiver is highly likely to be able to use any hash encoding to improve its understanding about how its target dataset differs from the master dataset. More specifically, parts of the master that a receiver knows it already has may be hashed and those hashes may be used, based on a received encoding or erasure hash (and possibly based also on information about how the encoding was encoded) to reproduce a needed hash. A receiver can use received, computed, and/or reproduced hashes to determine which parts of the master it might need. A receiver may use encodings of the blocks of the master to obtain blocks of the master, which may be applied to the receiver's target to construct a local copy of the master.

Many of the attendant features will be more readily appreciated as the same become better understood by reference to the following detailed description considered in connection with the accompanying drawings.

DESCRIPTION OF THE DRAWINGS

The present description will be better understood from the following detailed description read in light of the accompanying drawings, wherein:

FIG. 14 shows a table of empirical results for different download methods.

Like reference numerals are used to designate like parts in the accompanying drawings.

DETAILED DESCRIPTION

Overview of Data Synchronization

Figure 1:
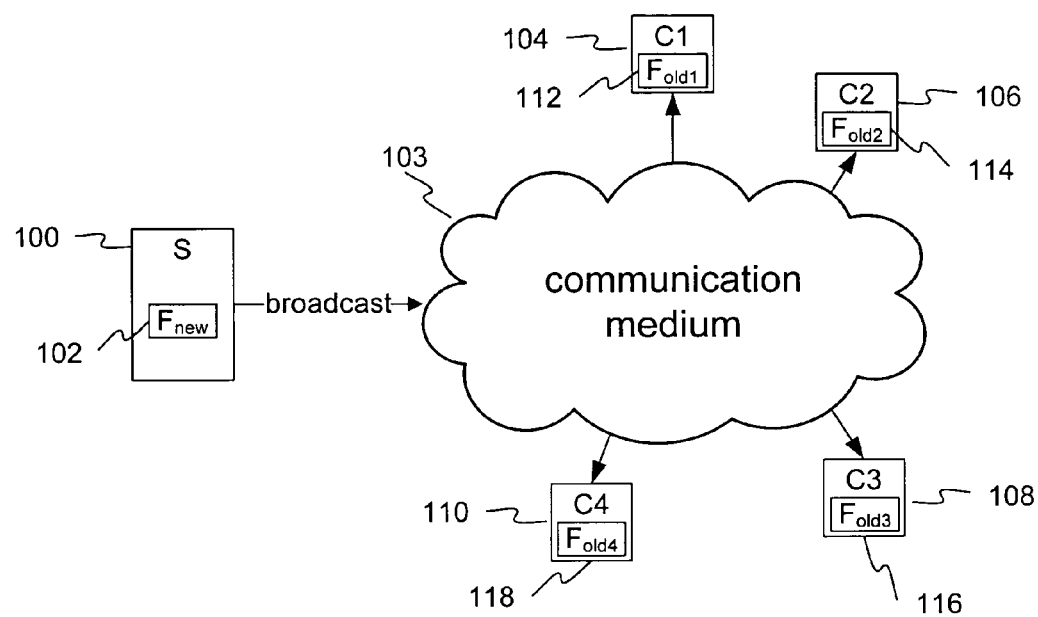
FIG. 1 shows a generic distribution arrangement.

FIG. 1 shows a generic distribution arrangement. A sender 100 has a master dataset 102. A communication medium 103 allows at least one-way communication from the sender 100 to receivers 104, 106, 108, and 110, each with its own target dataset, 112, 114, 116, and 118, respectively. The communication medium 103 could be a data network, a mobile wireless network, a radio broadcast, a system bus in a computer, or even physically distributed storage mediums such as diskettes. The target datasets 112, 114, 116, and 118 are various outdated versions of the master dataset 102. The target datasets 112, 114, 116, and 118 may differ from the master dataset 102 by varying degrees. Target datasets 112, 114, 116, and 118 are to be updated or synchronized to match the master dataset 102. A target dataset may be empty or may not have any parts of the master dataset.

Figure 2:
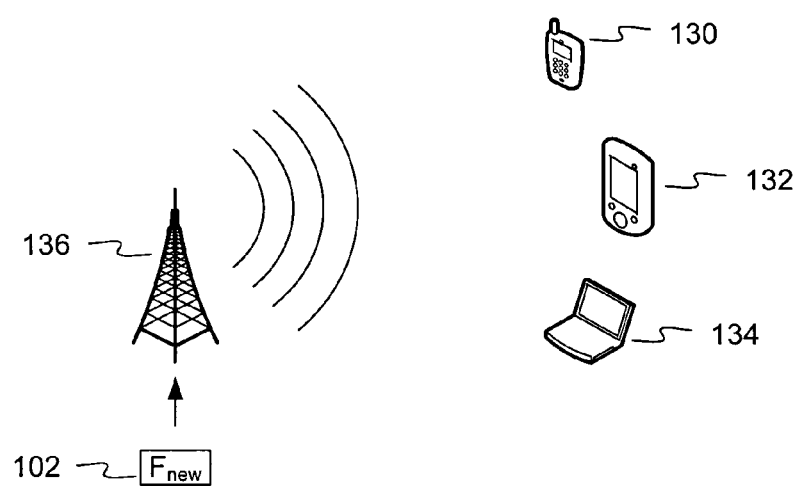
FIG. 2 shows an example of a wireless file distribution arrangement.

Because data synchronization is such a common task, it would be difficult to list all possible applications for an efficient data synchronization scheme. For example, data synchronization can occur between devices sharing a bus, between file systems, between applications, between systems, and so on. FIG. 2 shows an example of a wireless file distribution arrangement. In FIG. 2, various wireless mobile devices such as cell phone 130, PDA 132, and laptop 134 receive radio signals from broadcast system 136. Mobile devices, 130, 132, and 134 may each have their own outdated versions of master dataset 102. The radio signals convey information about the master dataset 102 that receivers can use to bring their respective versions of the dataset up to date. As mentioned above, wireless systems can particularly benefit from an efficient data synchronization scheme that minimizes listening time, minimizes latency, and minimizes battery consumption by minimizing CPU usage.

If each receiver had the same version of a dataset and listened to the sender at the same time, then updating would not be a difficult problem; the sender would send the particular differences between the master dataset 102 and the receiver's version, the receivers would receive the same difference information at the same time and apply the differences to reconstruct the master dataset 102. However, in reality receivers may have different versions of the master dataset 102, and some receivers may listen to the sender at different times.

Figure 3:
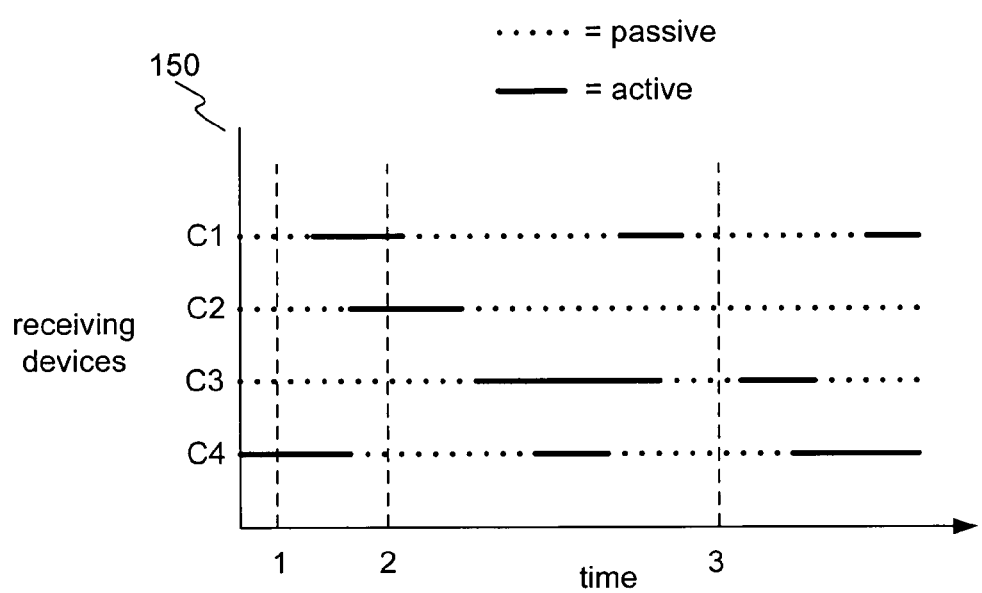
FIG. 3 shows a timeline of receivers.

FIG. 3 shows a timeline 150 of receivers. Four different receivers C1, C2, C3, and C4 are active at different times. At time 1, only C4 is active. At time 2, C1 and C2 are active. At time 3, no receivers are active or receiving information from the sender. Not only may receivers read or receive at different times, as noted above, the receivers may have different versions of the master dataset 102. To accommodate ranges of receiving times and target versions, the sender may take a one-size-fits-all approach. That is, the sender may send or broadcast one set of differential information that each receiver can apply to its version to identify differences or reconstruct a local copy of the master dataset 102. One approach for providing differential information is to use a hierarchical hash scheme.

Simple Hierarchical Hashing

Figure 4:
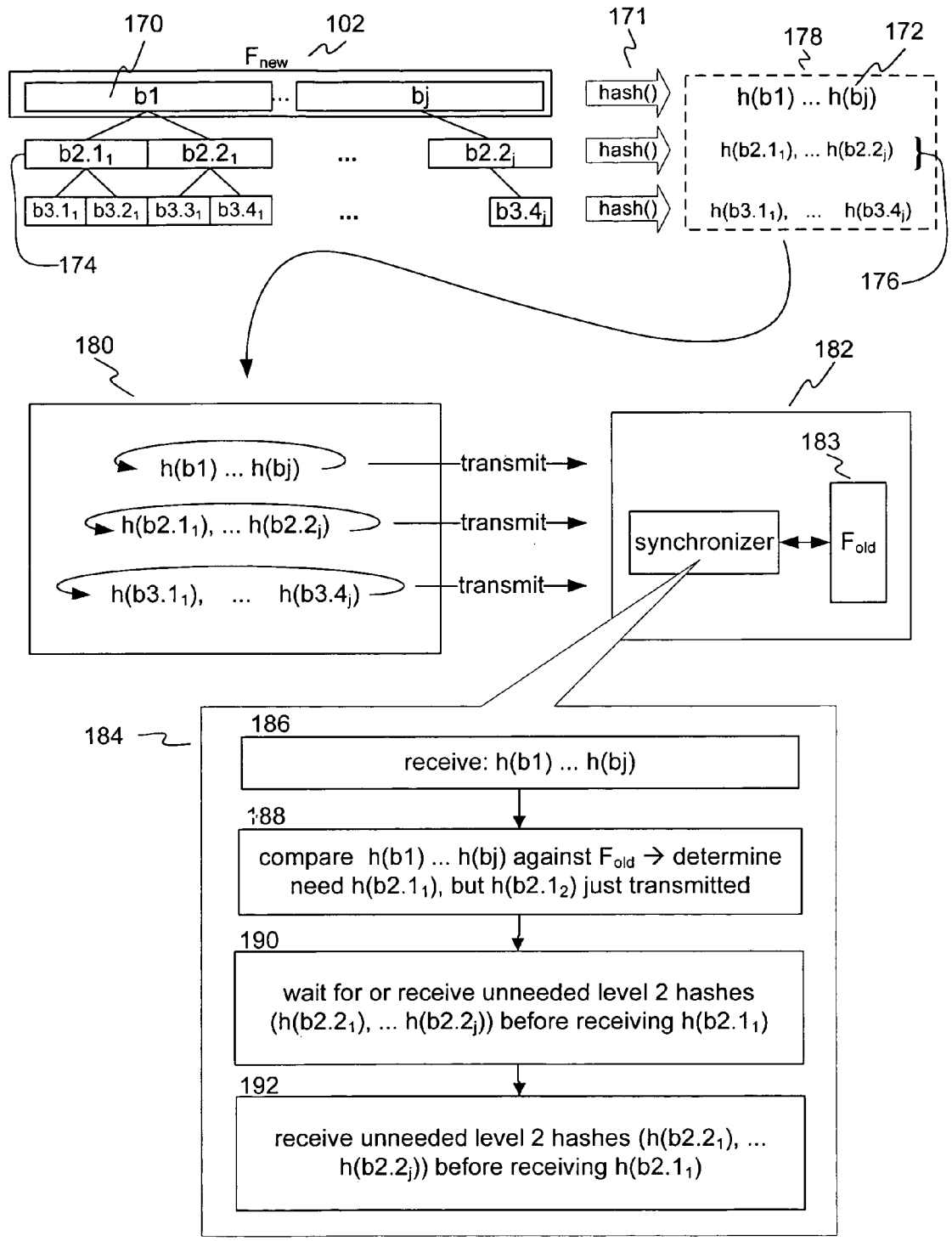
FIG. 4 shows a hierarchical hash scheme.

FIG. 4 shows a hierarchical hash scheme. The master dataset 102 is implicitly or explicitly divided into coarse top level blocks 170 (b1, ..., bj). A hash function 171 is applied to the top level blocks 170, creating top level block hashes 172. The top level blocks 170 are subdivided into two or more smaller blocks 174 (b2.1$_1$, ..., b2.2$_j$). The hash function 171 is applied to the smaller blocks 174 to create second level hashes 176, and so on. In the example in FIG. 4, hash hierarchy 178 has three levels but two or more may be used. Any receiver possessing a complete hash hierarchy 178 can determine its differences over the sender's master dataset 102. The sender 180 may broadcast or send each level of the hash hierarchy 178 on a different communication channel (not shown). The hashes of each level are repeatedly sent as though on a data carousel. The receiver 182 receives the transmitted hashes and also data blocks of the master dataset (not shown) and performs a reconstruction process 184 using it target dataset 183 (an outdated version of master dataset 102).

Regarding the reconstruction process 184, receiver 182 initially reads or receives 186 the top level block hashes 172. The receiver 182 compares 188 the top level block hashes 172 against the target dataset 183 ($F_{old}$). More specifically, the receiver 182 moves a sliding window (the size of a top level block 170) across the target dataset 183, applying the hash function 171 to windowed blocks in the target dataset 183. The matching process can also be done through hierarchical fingerprints as described elsewhere and as discussed further below. If the hash of a windowed block in the target dataset 183 matches a top level block hash 172, then the block in the target dataset 183 is marked as a match and the sliding window moves to the next unmatched block in the target dataset 183. To aid eventual reconstruction of the master dataset 102, matched blocks from target dataset 183 may be accumulated into a temporary file. Furthermore, by identifying top level signatures or hashes 172 that do not map to a top level block in target dataset 183, the receiver 182 in effect identifies top level blocks 170 in the master dataset 102 that are not found in the target dataset 183 (although the receiver 182 does not yet know the contents of these missing blocks, it does know that they are not in its target dataset 183). In other words, the receiver 182 can identify any top level hashes 172 of the master dataset 102 that are not mapped-to by any part of the target dataset 102.

Referring again to the reconstruction process 184, if the receiver 182 compares 188 the top level hashes 172 and determines that top level block b1 is not in the target dataset 183, then the receiver will need second level hashes h(b2.1$_1$) and h(b2.2$_1$) to identify the portion of block b1 (e.g. b2.1$_1$ or b2.2$_1$) that is not in the target dataset 183. However, if h(b2.1$_1$) has just passed on the second level data carousel, then the receiver 182 will have to wait 190 for all of the other level two hashes 176 to transmit on the data carousel before actually receiving 192 the level two hash that it needs. This unproductive waiting time increases the time that it takes for the receiver 182 to synchronize its target dataset 183. If the receiver 182 is a wireless device, then power may be consumed receiving unneeded hashes. On average, a receiver will wait for half the number of hashes of a hierarchy level before receiving a needed hash, and the cost will increase with the number of levels in the hash hierarchy.

Erasure Encodings of Hash Hierarchy, or "Erasure Hashes"

Figure 5:
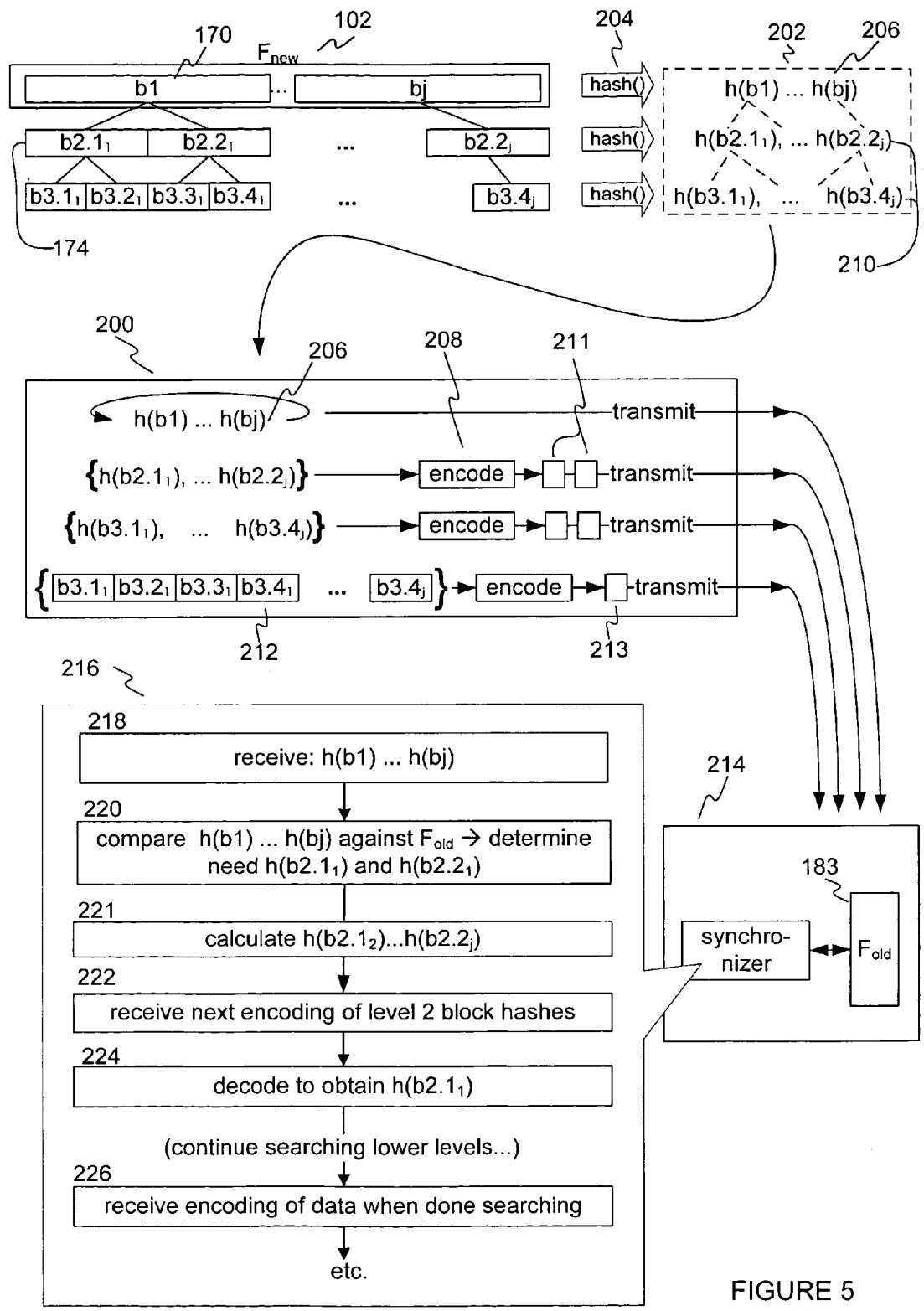
FIG. 5 shows an efficient hash hierarchy encoding scheme.

FIG. 5 shows an efficient hash hierarchy encoding scheme. In FIG. 5, sender 200 generates a' hash hierarchy 202 preferably using a special hash function 204. The dashed lines in hash hierarchy 202 indicate a mathematical relationship between the hashes in neighboring levels. This relationship results from the choice of hash function 204 and will be explained further below. Sender 200 carousels the top level block hashes 206. However, rather than carousel or transmit the lower level hashes 210 themselves, the sender 200 first encodes 208 the lower level block hashes 210 and transmits encodings 211 of the lower level hashes 210. The sender 200 also encodes 208 data blocks 212 (b3.1 1, b3.2 1, ... b3.4$j$), which contain the actual content of the master dataset 102. The encodings 213 of the data blocks 212 are also transmitted. The encoding 208 is discussed below with reference to FIG. 7.

Receiver 214 receives transmissions from the sender 200 and performs a synchronization or reconstruction process 216. The receiver 214 receives 218 the top level block hashes 206. Similar to step 188 in FIG. 4, the receiver 214 compares 220 the top level hashes 206 against the target dataset 183

($F_{old}$) to determine which second level hashes will be needed to identify unmatched parts of unmatched level one blocks 170. For example, the receiver 214 may determine that block b1 is not found in the target dataset 183 and level two hashes—h($b2.1_1$) and h($b2.2_1$)—will be needed to determine whether target dataset 183 has either block $b2.1_1$, or block $b2.2_1$, or neither. However, rather than having to wait for a data carousel to come around with the block hashes for those particular blocks, the receiver 214 first calculates 221 determinable hashes h($b2.1_2$) . . . h($b2.2_j$), which it can calculate by applying the known hash function 204 to copies of blocks $b2.1_2$ . . . $b2.2_j$ (from its target dataset 183) which it knows from step 220 match the master dataset 102. The receiver then receives 222 the next (or any) encodings 211 of the level 2 hashes and, using the calculated 221 hashes at the same level, decodes 224 them to produce the needed block hashes, in this example h($b2.1_1$) and h($b2.2_1$). Note steps 221 and 222 can occur in any order. Given sufficient block hashes the receiver 214 is easily able to determine which data blocks (e.g. $b3.2_1$ and $b3.4_1$) need to be applied to the target dataset 183 to reproduce the master dataset 102. However, as with the block hashes, the receiver 214 does not need to wait for a particular data block to arrive. Instead, the receiver 214 receives 226 any encodings 213, preferably the next transmitted encodings 213, and uses the received 226 encodings 213 to reproduce the needed data blocks.

Notably, with a well-chosen encoding scheme such as an erasure encoding, the receiver 214 is likely to be able to use any encodings 211/213 to help reconstruct the needed block hashes (e.g. h(b2.1 and h(b2.2)) or data blocks 212. In other words, each encoding 211 received by receiver 214 is likely to contribute to the reconstruction of a needed block hash and the subsequent identification of portions of the master dataset 102 that are missing from the target dataset 183. Each encoding 213 of the data blocks 212 is likely to contribute to the reconstruction of a needed data block. However, the decoding process may not be able to commence until all needed encodings are received, although progressive decoding is sometimes possible.

Figure 6:
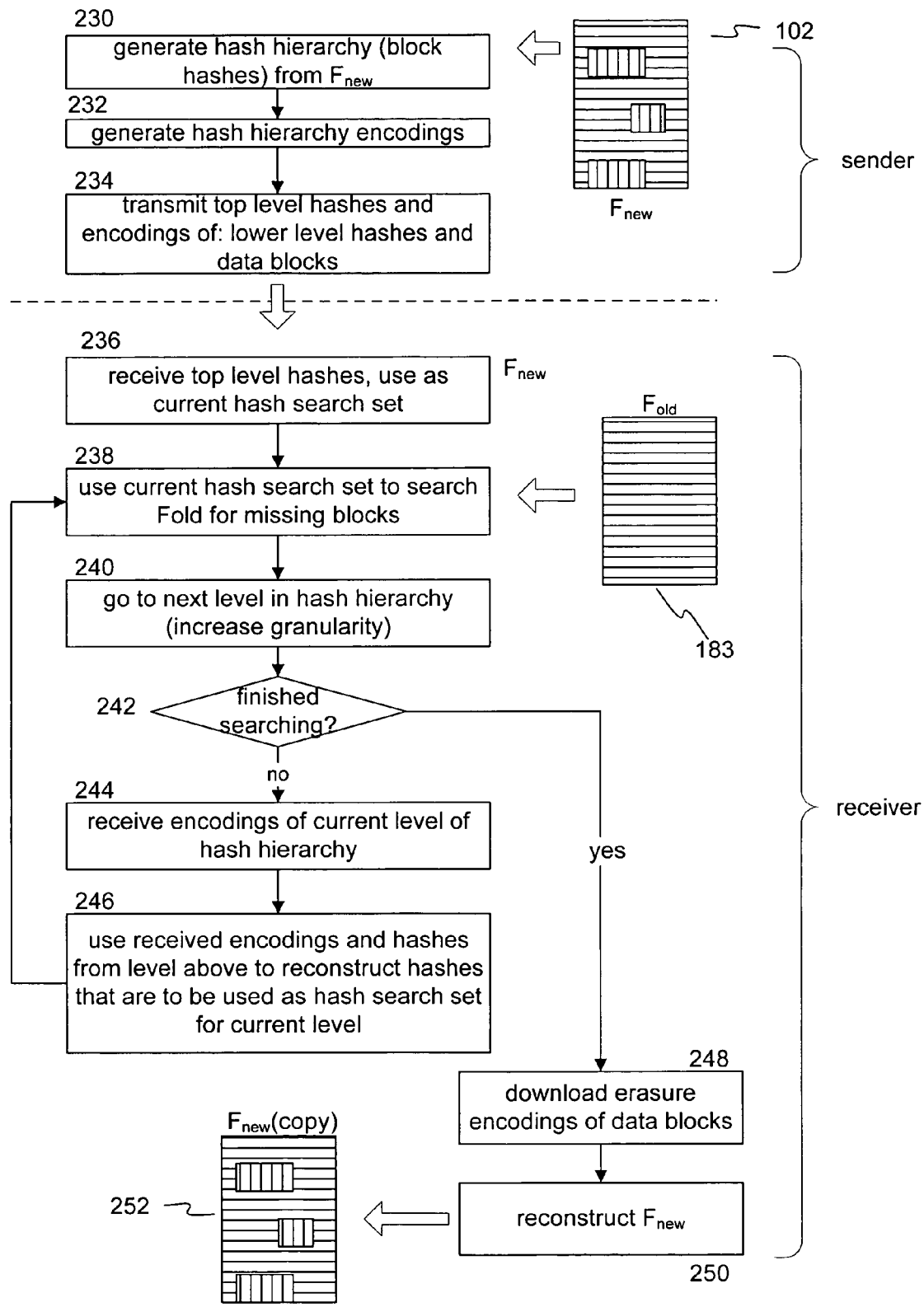
FIG. 6 shows a process of a sender providing update information to a receiver and a receiver performing an update.

FIG. 6 shows a process of a sender providing update information to a receiver and a receiver performing an update. The sender generates 230 a hash hierarchy as discussed above. Namely, the sender generates 230 block hashes of divisions and subdivisions of the master dataset 102 ($F_{old}$). The sender generates 232 encodings of the hash hierarchy. The sender then: transmits 234 the top level block hashes of the hash hierarchy (the hashes of the largest divisions of the master dataset 102); transmits 234 encodings of the lower level hashes; and transmits 234 encodings of blocks of the actual content of the master dataset 102. Level one hashes can also be encoded, however, most of the time this will not provide a significant benefit.

To identify blocks of data (via their hashes/signatures) that it will need to reconstruct the master dataset 102, the receiver iteratively downloads transmissions from the sender and reconstructs, level by level with increasing fineness, hashes of the hash hierarchy that it determines it needs. The receiver obtains the top level of the hash hierarchy by receiving 236 the top level hashes, which it uses as a current hash search set. The receiver uses 238 the current hash search set to search the target dataset 183 ($F_{old}$) for hashes in the current search set that do not have a matching block in target dataset 183. The receiver then goes 240 down to the next level of the hash hierarchy. If the searching is not finished 242 then the receiver receives 244 the encodings of the new level of the hash hierarchy. The receiver uses 246 the encodings and the sub-hashes for the matched blocks at the current level to reconstruct block hashes at the new/current level that will be used as the hash search set, again performing a search 238. Sub-hashes for matched blocks can be easily calculated by the receiver since the receiver is also aware of the hashing algorithm used by the server and the receiver has the same content of the matched blocks in its target dataset.

The searching 238, receiving 244, and reconstruction 246 are repeated at lower finer levels until there is a determination that the overall searching process is finished 242. This determination can be as simple as reaching a predetermined or lowest level of the hash hierarchy, or it could be a dynamic determination based, for example, on whether new searches 238 are improving the receiver's knowledge of the master dataset 102. If the receiver realizes that it did not match anything at the first level, then it will not need to download the second level. If the receiver realizes that it has many matches on the first level, but on the second level and third levels it keeps matching the same things, then it realizes it cannot get any more information than it got on the third level, and it may stop. In other words, the receiver can measure the benefit at a given level and stop if there is no benefit. This adaptive search approach allows the receiver to search with fine granularity when there are only small differences between the master dataset 102 and the target dataset 183. The receiver may search with coarse granularity when there are large differences between the datasets 102, 183. Put another way, the receiver can dynamically adjust how much of the hash hierarch it will need to download.

Returning to FIG. 6, when the receiver has finished searching 242, arbitrary erasure encodings of the data blocks may be downloaded 248 in a quantity proportional to the number of unmatched hashes at the lowest level of the hash hierarchy. The encodings of the data blocks may be decoded and used to reconstruct 250 a copy 252 of the target dataset 102.

It may be surprising that, at a given level, any commonly transmitted encoding is highly likely to allow any receiver to make a determination at that level about what part of the master dataset is not missing from a receiver's particular master dataset. Following is an explanation of how the same encoding can be used to help different receivers reconstruct different particular portions of the hash hierarchy that the different receivers need. Consider the following conceptual illustration. Two receivers, Receiver1 and Receiver2, both need to learn two numbers, "1" and "2", and the receivers are listening from a server that has to provide these two numbers. If Receiver1 already knows "1", and Receiver2 already knows "2", the server can tell Receiver1:"2" and can tell Receiver2:"1". Then Receiver1 and Receiver2 will know both numbers. However, it will have cost the server two numbers/operations (inform Receiver1, inform Receiver2). If, instead, the server sends both receivers "3", and sends information instructing the receivers to "subtract the number that I'm sending you from the number that you have" (i.e. the server says, "3 and subtract"), then Receiver1 will subtract 1 from 3 to obtain 2; its missing number. Similarly, Receiver2 will subtract 2 from 3 to obtain its missing number; 1. With the same transmitted information each receiver can generate the number it needs. The server saved time and bandwidth by providing a number that is really a combination of the numbers that the receivers already have and by providing an operation that can reconstruct the number a receiver is missing. As discussed below, block hashes can be encoded with a similar concept.

Figure 7:
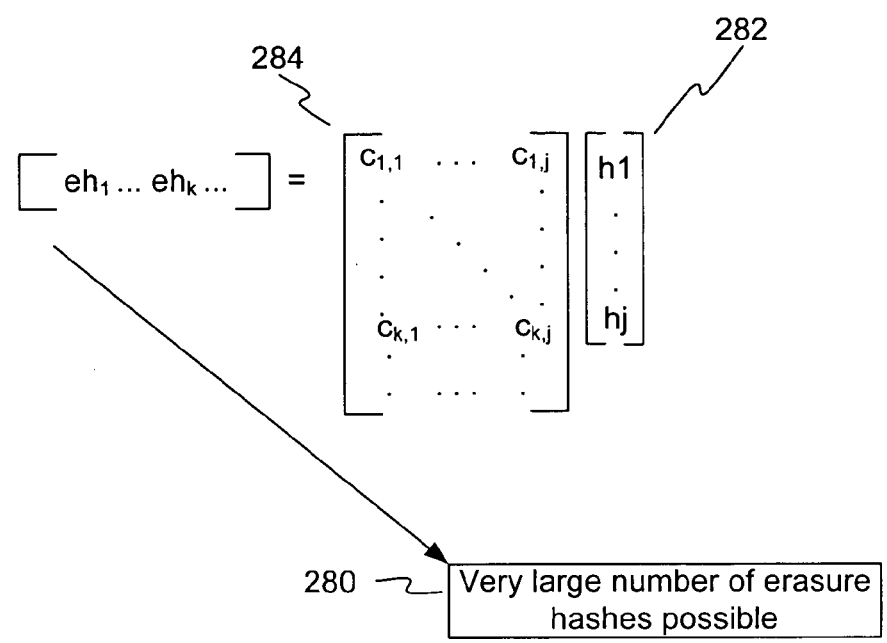
FIG. 7 shows an erasure hash encoding scheme.

FIG. 7 shows an erasure hash encoding scheme. In general, a sender can encode block hashes into erasure hashes (encodings of block hashes) by taking the block hashes at a given level and combining them. A random linear combination of block hashes is an efficient way to combine block hashes. In FIG. 7, an erasure hash 280 is produced by crossing a vector 282 of preferably random coefficients with a matrix 284 of block hashes. Each erasure hash 280 is produced by its own corresponding vector of random coefficients. Operations happen in a finite field, e.g. Galois Field ($2^{16}$). If the receiver knows the coefficients 282 and the erasure hash (encoding) 280, and if the receiver knows sufficient hashes in the matrix 284, then the receiver can use known linear algebra techniques to solve for a missing hash. The receiver can hash blocks in its target dataset that are known to match the master dataset to locally obtain some or most of the hash vectors in the matrix 284. Unknown hashes can then be solved using the known vectors in the matrix 284, using the known coefficients 282, and using one or more erasure hashes 280. Generally, the number of erasure hashes needed by the receiver will be proportional to the number of known blocks (or, conversely, the number of unknown hashes). To further explain, if a receiver has an original block it really has a vector of all zeroes and a one, which is like knowing a variable in a system of equations for variables, e.g. $X1 \ldots X5$. Knowing $X1 \ldots X4$ (from the local original/matched blocks), the final variable X5 can be found because the final equation, the erasure hash, may have something like $X1+3X2+ \ldots +5X5=c$. From this, and the known values for $X1 \ldots X4$ it is possible to solve for the last variable X5.

Figure 8:
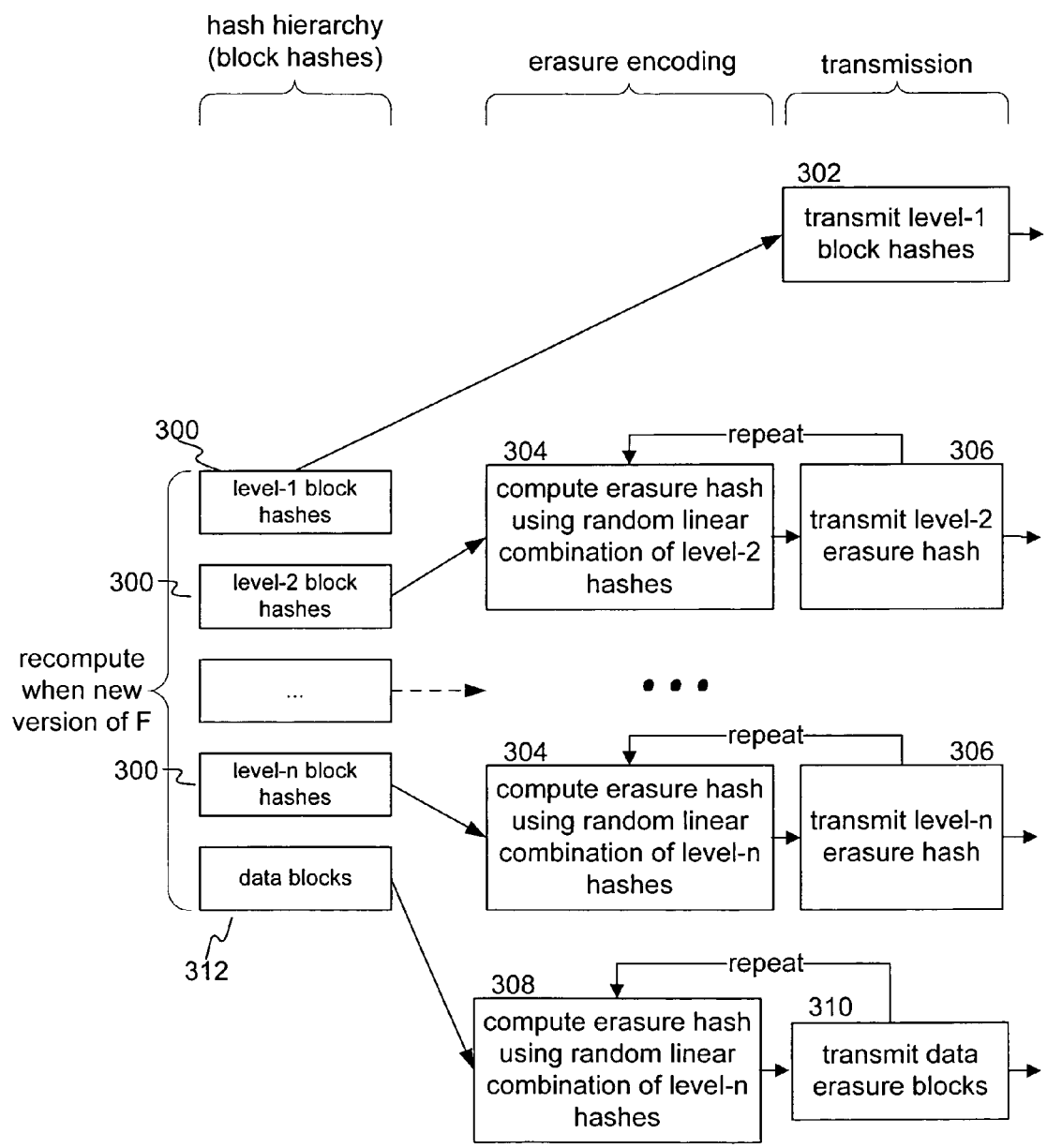
FIG. 8 summarizes a hashing, encoding, and transmission process for a sender.

FIG. 8 summarizes a hashing, encoding, and transmission process for a sender. As mentioned above, the sender can generate or otherwise obtain block hashes 300 for increasingly smaller blocks of subdivisions of a target dataset. The sender transmits 302 the level-1 block hashes, preferably on their own communication channel. For each level of block hashes 300 below level-1 the sender computes 304 an erasure hash as a random linear combination of the block hashes 300 at that level. The erasure hash is transmitted 306. The computing 304 and transmitting 306 is repeated to produce a stream of substantially unique erasure hashes for each level. The sender also encodes 308 the data blocks 312 into an erasure block and transmits 310 the erasure block. The encoding 308 and transmitting 310 is repeated to provide a steady stream of erasure blocks of the content of the master dataset 102. Preferably, the stream of erasure blocks has its own communication channel. Each stream of erasure hashes preferably has its own communication channel, which allows different receivers to pull an erasure hash from any level at any time without having to wait. Parallel transmission 302, 306, 310 of top level block hashes, erasure hashes, and erasure blocks is preferred but not necessary.

Although not shown in FIG. 8, the sender may also transmit with each erasure hash the vector of coefficients that were used to produce the erasure hash. An efficient alternative is to have the sender transmit a seed for a random number generator. Each receiver can use the seed and generator to reproduce the same sequence of coefficients used by the sender to linearly combine hashes to produce erasure hashes. A large book of predetermined coefficients could be stored in advance at the sender and each receiver. Any coefficient sharing mechanism may be used.

Many hash algorithms can be used for block hashing. Preferably the block hash is a weak rolling block hash, as used with the well known rsync algorithm. With a rolling block hash, if a block is hashed (producing a first hash) and then the block is extended by a small amount, the first hash can be used to cheaply hash the extended block.

A rateless erasure algorithm has been described above. If, in terms of network layers, the erasure algorithm is implemented at the application layer, then error correction can be presumed to be handled at a lower layer such as the link or transport layer. However, if error correction or redundancy is desired, a rated erasure may be used to provide error correction.

In one embodiment an erasure hash may be a random linear combination of all the block hashes at the level of that erasure hash. However, for efficiency a linear combination of a subset of block hashes can be used, which makes the encoding matrix sparser. If all block hashes are used then the encoding matrix will not be sparse. A non-sparse matrix may require a lot of time to decode at the receiver side because more equations need to be solved. For the block hashes this is not much of a concern because the hashes are small, but the actual downloaded content data blocks may be relatively large and solving a full matrix can be expensive. It is possible to probabilistically produce some linear combinations that are just a combination of one data block. If only some blocks (not all of them) are encoded there is a chance that a receiver will receive a block that it already has. However, to avoid downloading redundant data a receiver can skip a data block if it already has the coefficients for that block. That is, if the receiver knows the coefficients of a forthcoming block, for example by receiving it before receiving a block or by using the shared-seed scheme discussed above, then the receiver can use the coefficients for the data block that is going to be distributed next to determine whether that upcoming data block will provide information new to the receiver.

This determination may be made by calculating the rank of the matrix of coefficient vectors; the receiver already has a set of blocks and it knows the coefficients of those blocks, so it can start building the matrix. A receiver can download the seed, calculate the coefficients that are going to be used for the next/new block, add those coefficients to those that it already has stored locally. The receiver can then calculate the rank of the combined matrix. If the rank increases by one that indicates that whatever is being broadcast through the air is new to the receiver. Otherwise, the receiver won't need it. Calculating the rank is a way to make sure that the new coefficient vector is linearly independent of the coefficient vectors for blocks already received or known by the receiver. If the rank does not increase that indicates that the new coefficient vector is linearly dependent on what the receiver already has, i.e. no new information will be obtained. If, for example, a data block is one megabyte, it might take 5 minutes for it to be downloaded by the receiver. But, if the receiver only has to download the relatively small coefficients (e.g. 16 bytes) produced by the seed to determine whether or not to download the next data block, the receiver can skip the block and wait for next coefficients/block, etc.

Whether to use block prediction as discussed above may be decided by weighing the overhead against the fairly low probability that a receiver will receive information that it will not need. Most of the time data blocks are linear combinations of all of the blocks and will be useful to a receiver.

Decomposable Erasure Hashes

For the following discussion, u(i) is a shorthand expression for the number of unmatched blocks at level i.

In a simple embodiment, assuming that each block is divided into two sub-blocks, for each level i>1 of hash values, the receiver downloads u(i-1)*2 erasure hashes in order to reconstruct the correct set of hashes at level i. However, the number of erasure hashes downloaded at level i can be halved by using decomposable homomorphic hashes. Such hashing functions hold the property that $h(a)=h(b)+h(c)$ where a is the top level block, and b and c are the sub-level blocks corresponding to the top-level block a. This property enables a receiver to reconstruct all hashes at level i by downloading only half as many erasure hashes, that is, by downloading u(i−1) erasure hashes.

Following is an explanation of a decomposable hash function. Assume that a top-level block is created out of bytes [l, r], and the corresponding children blocks are [l,m] and [m, r]. A hash function is decomposable if h(f[m+1, r]) can be computed from the values h(f[l, r]), h(f[l,m]), r−l, and r−m−1, and also h(f[l,m]) from h(f[l, r]), h(f[m+1, r]), r−l, and m−1. Use of a decomposable hash function can save on the cost of delivering block hashes used to identify matching data. Since receivers already have a hash for the parent block, they can receive one additional hash per pair of sibling child blocks, the hash for the other sibling can then be computed from these two.

In general, decomposable hashes can be implemented using homomorphic hashing functions, which are known and described elsewhere. Where h(a+b)=h(a)+h(b) or h(a*b)=h(a)*h(b), a and b being two different blocks, h( ) may be said to be homomorphic. Preferably, a decomposable function h(f[l, r]) for a block at a given level is equal to h(f[l,m])+h(f[m, r]), where h(f[l,m]) and h(f[m, r]) are the hashes for the corresponding sibling blocks at the next hierarchy level. To this extent, h may be defined such that $$h(b_1, \ldots, b_n) = \sum_{v=1}^{v=n} g^v \cdot b_n,$$

where $b_i$ is an individual block, $(b_1, \ldots, b_n)$ is the parent block made of the concatenation of blocks $1, \ldots, n$, and g is a generator number of a given Galois field. Or, $$h(b_1, \ldots, b_n) = \sum_{v=1}^{v=n} c_v \cdot b_n$$

where $c_v$ are random coefficients.

It was not previously known that decomposable hashes can be efficiently used in combination with erasure hashes. Decomposable hashes at a given level can be used as input to the erasure decoding algorithm at the next level of hierarchy where, given the parent hash and an additional erasure block, any of the siblings can be reconstructed. In fact, decomposable parent hashes can be interpreted as simple linear combinations of the two child block hashes when the erasure hash is created as the addition of two hashes.

To explain further, consider a receiver that downloaded an erasure hash from level 1. That hash failed, and the receiver goes to level 2. At level 2 the receiver needs 2 master block hashes to determine if it is the first or second half of that block that is missing. The receiver only needs to download one erasure hash. This has not been possible with previous block hashing methods. However, by producing erasure hashes as linear combinations of block hashes, it is possible to preserve the homomorphic decomposability of the block hashing function. With homomorphic decomposability, if each erasure hash is thought of as an equation, and each block is thought of as a variable, and there are 1,000 variables, only one equation that is linearly independent with the known equations will be needed to solve the unknown variable if 999 variables are known. To reproduce the newly needed block hash the receiver only needs the 999 downloaded/known block hashes, the 1 erasure hash, and the corresponding vector (coefficients) that was used to generate that erasure hash.

Figure 9:
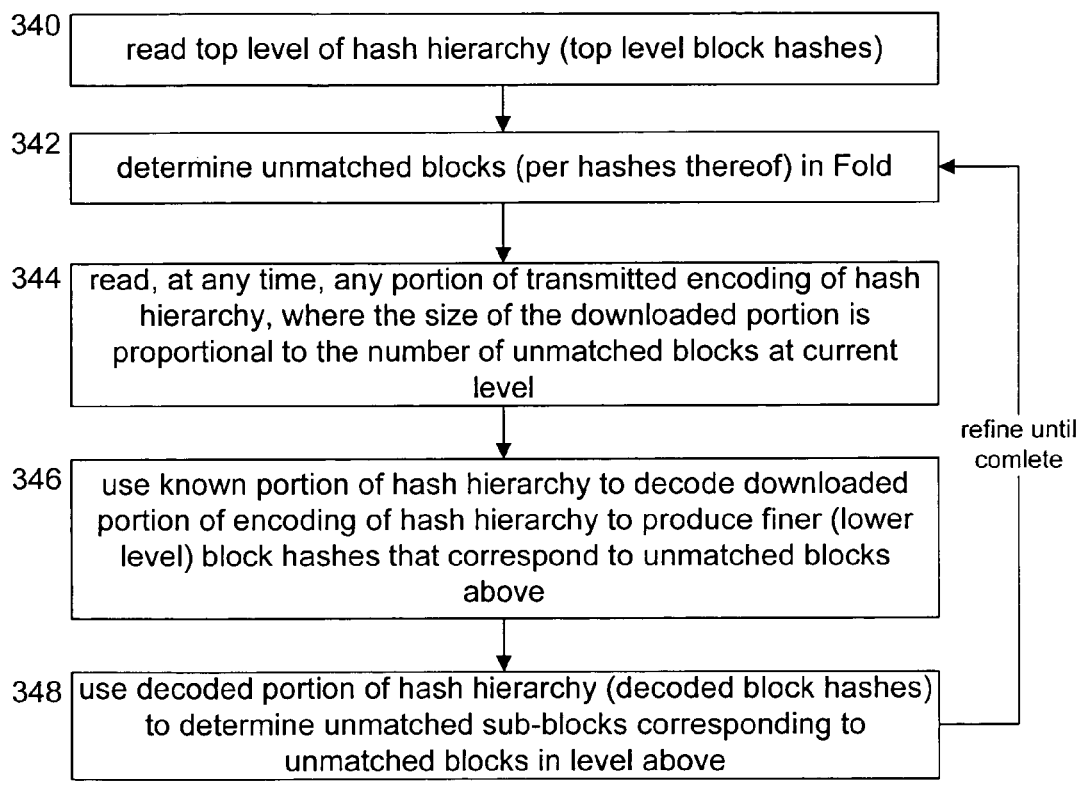
FIG. 9 shows an overview of how a receiver can find unmatched blocks in its target dataset.

FIG. 9 shows an overview of how a receiver can find unmatched blocks in its target dataset. The receiver reads 340 the top level of the hash hierarchy which it uses to determine 342 hashes—and therefore blocks—of the master dataset that do not have a top-level equivalent in the target dataset. For convenience, the hashes can be stored in a dictionary. Each top-level block in the target dataset (moving one byte or symbol at a time) is hashed and its hash is searched for in the dictionary. The receiver then reads 344, at any time, any portion of the transmitted encoding of the hash hierarchy, where the size of the downloaded portion is proportional to the number of unmatched blocks at the current level. The portion of the hash hierarchy that is known to the receiver is used 346 to decode the portion of the hash hierarchy needed by the receiver. These decoded block hashes are hashes of finer sub-blocks of the unmatched blocks in the level above. The decoded portions of the hash hierarchy (the decoded block hashes) are used 348 to determine unmatched sub-blocks corresponding to the determined 342 unmatched blocks in the level above. The process may be repeated downward as necessary and then the necessary data blocks may be obtained by the receiver.

Figure 10:
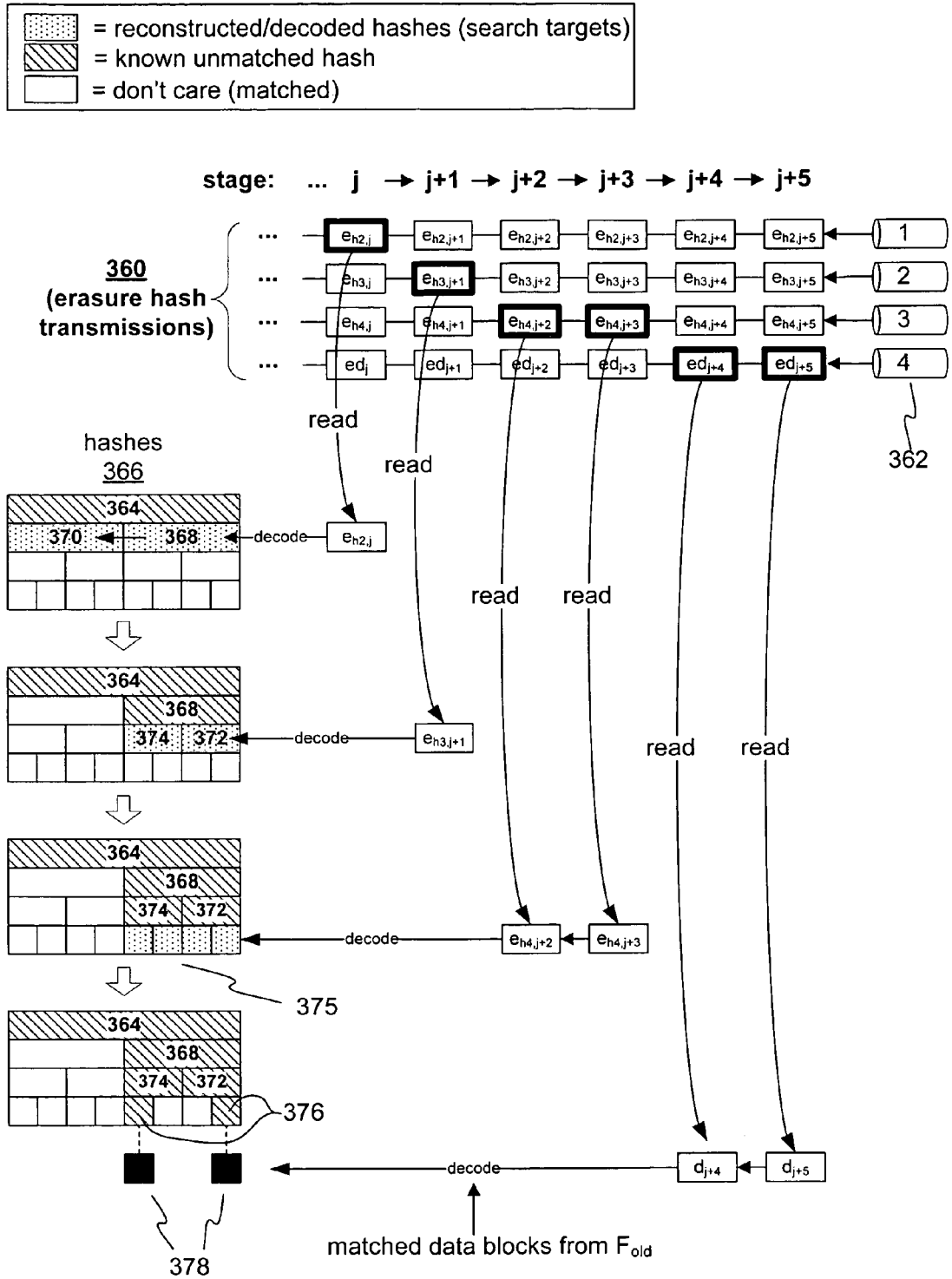
FIG. 10 shows a reconstruction process performed by a receiver when the sender uses a decomposable erasure scheme.

FIG. 10 shows a reconstruction process performed by a receiver when the sender uses a decomposable erasure scheme. Erasure hashes 360 are transmitted via 4 channels 362. The "h2" erasure hashes are at level-2, the "h3" hashes are at level-3, and the "h4" hashes are at level-4. At stage j the receiver knows that block 364 is the only unmatched level-1 block hash. As an aside, block hashes 366 are shown with different size to emphasize the sizes of the blocks that they represent. In practice, the block hashes 366 are preferably the same size or same order of magnitude. Returning to stage j, the receiver did not match level-1 master hash 364 so the receiver needs to determine whether its target dataset has either of the master sub-blocks of hash 366's master block. As discussed above, because only 1 master block/hash is unmatched at stage j, the receiver only needs to download one level-2 erasure hash. Therefore, the receiver reads, from channel 1, erasure block hash $e_{h2,j}$. Because the hash function is decomposable, the receiver uses hash 364, erasure hash $e_{h2,j}$, and the other hashes for matched blocks at level 2, to produce hash 368 and hash 370. The receiver then determines whether hashes 368 and 370 have matching blocks in its target dataset. In the example in FIG. 10, hash 368 is not matched and hash 370 is matched. Moving to stage j+1, the receiver again needs to download only one erasure hash, level-3 erasure hash $e_{h3,j+1}$, which it reads from channel 2. Hash $e_{h3,j+1}$ is used together with hash 368 to compute hash 372 and hash 374. The receiver then uses these hashes to determine which sub-blocks of hash 368's master block are missing from the target dataset. Neither hash matches and at stages j+2 and j+3 the receiver reads the next two level-4 erasure hashes from channel 3; $e_{h4,j+2}$ and $e_{h4,j+3}$. The child hashes 375 of hashes 372 and 374 are computed and used to determine that level-4 hashes 376 do not have a match. At stage j+4 the receiver knows that it only needs two data erasures and reads data erasures $ed_{j+4}$ and $ed_{j+5}$ from channel 4. Using previously matched data blocks from the target dataset ($F_{old}$) and the known coefficients with which data erasures $ed_{j+4}$ and $ed_{j+5}$ were encoded, the receiver decodes the data erasures $ed_{j+4}$ and $ed_{j+5}$ to produce the missing master data blocks 378 that correspond to block hashes 376.

Figure 11:
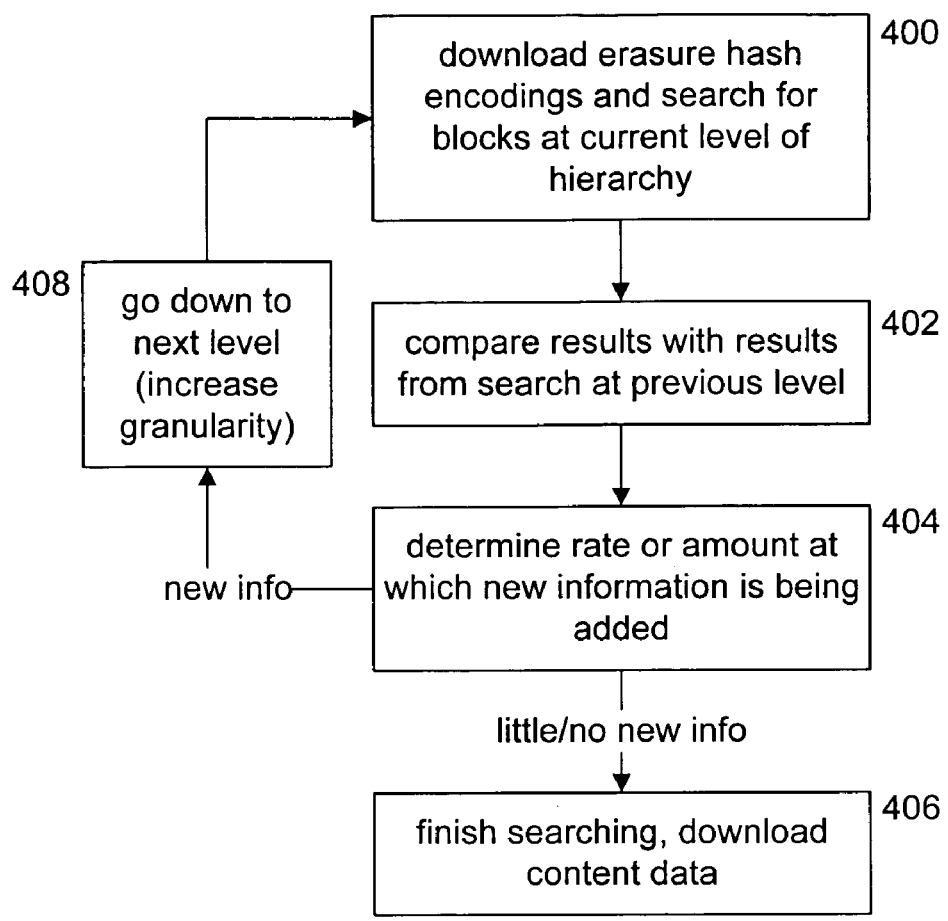
FIG. 11 shows a process a receiver may use to determine when to stop downloading erasure hashes.

FIG. 11 shows a process a receiver may use to determine when to stop downloading erasure hashes. The receiver downloads 400 erasure hashes and searches for blocks at the current level of the hierarchy. The results are compared 402 to results from searching at the previous level. The receiver determines 404 the rate or amount of new information being added. Methods for making determination 404 are discussed above. If the rate is low or if no new information is being added, then the receiver finishes 406 searching and may download content data. Otherwise, the receiver goes 408 to the next level and repeats steps 400, 402, and 404.

Significantly, a receiver can quickly obtain the hashes it needs, by downloading an amount of information proportional to the number of missing hashes/blocks yet without having to provide feedback to the sender.

Settings and Emperical Results

Some empirical results and preferred parameters will now be discussed. According to tests, any random generator will suffice but most processors will be most efficient with 2-byte coefficients. Furthermore, a hash size of 7 bytes was found to be optimal for many types of applications. An MD5 or SHA1 hash can be used as a signature to verify that a reconstructed dataset matches its master dataset. Although the examples above discuss dividing a block into two sub-blocks at each level, the same idea works similarly for an arbitrary number of sub-blocks per block.

Figure 12:
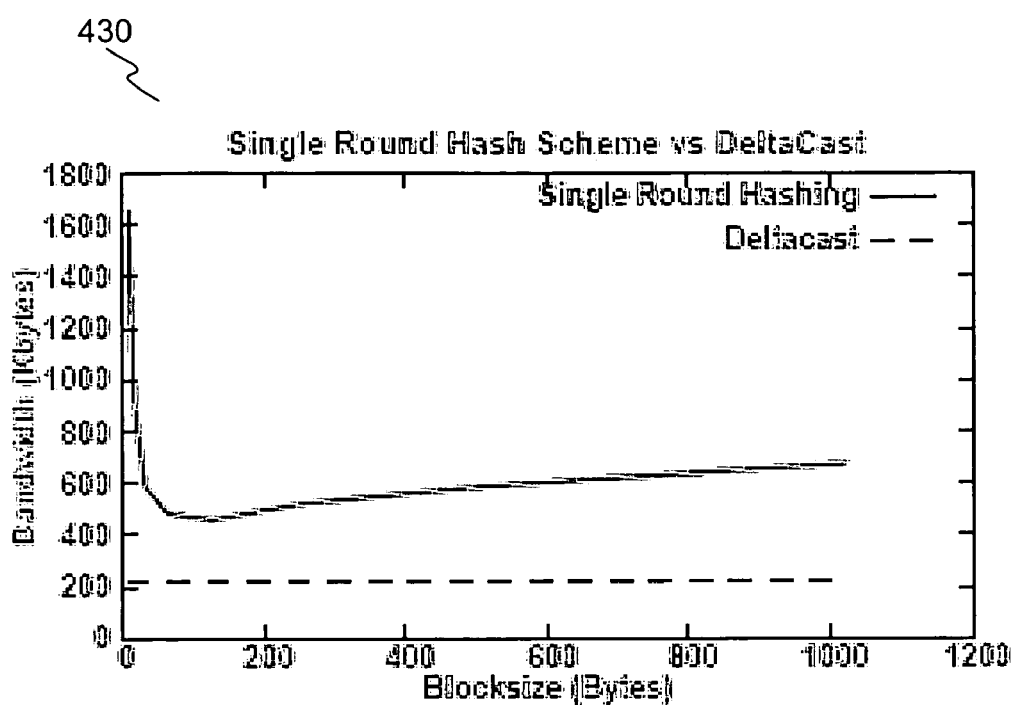
FIG. 12 shows a graph.

FIG. 12 shows a graph 430. In graph 430, it can be seen that over a range of different blocksizes hierarchical hashing ("DeltaCast") requires less than half the bandwidth of a single round hashing scheme. Further regarding block size, the blocks of the master dataset do not have to be divided into fixed sizes. Variable sized blocks can be used for greater efficiency. As long the receiver knows the sizes in advance the same techniques may be used. Rather than use a rolling window sized to the size of the blocks at the current search level, the rolling window can be matched to a certain value (fingerprint) that identifies the border of a block. That is, the window keeps rolling until the edge of the window matches another border identifier/value, and so on. This variable block size approach works well when the master file or dataset is updated with arbitrary insertions/deletions. There may be a range of block sizes at one level, and at the next level the range of block sizes will be halved. However, blocks will need to be padded to a multiple of a fixed block size.

Figure 13:
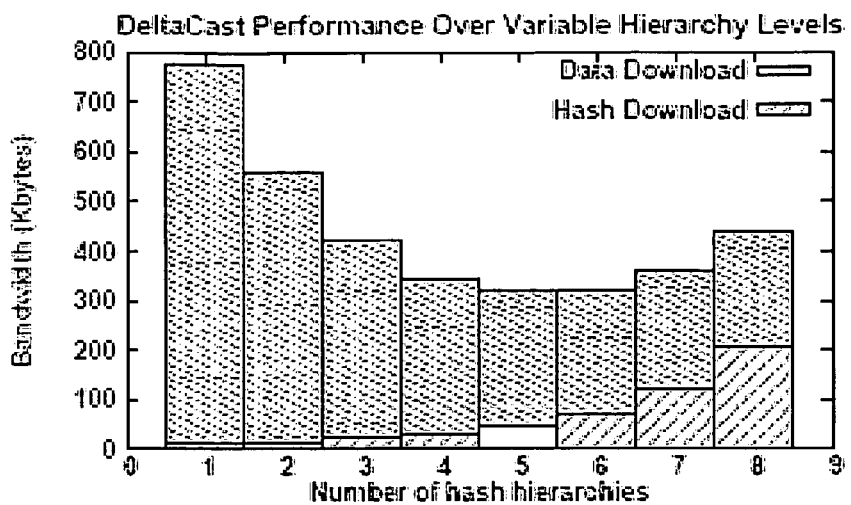
FIG. 13 shows three performance graphs.
Figure 13:
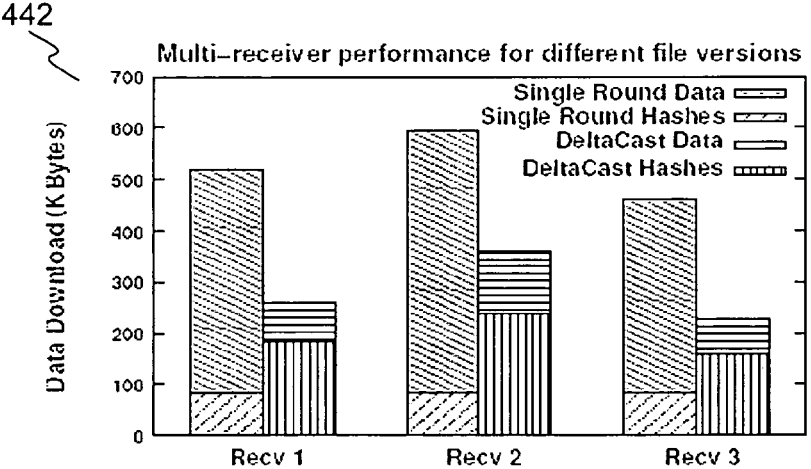
Figure 13:
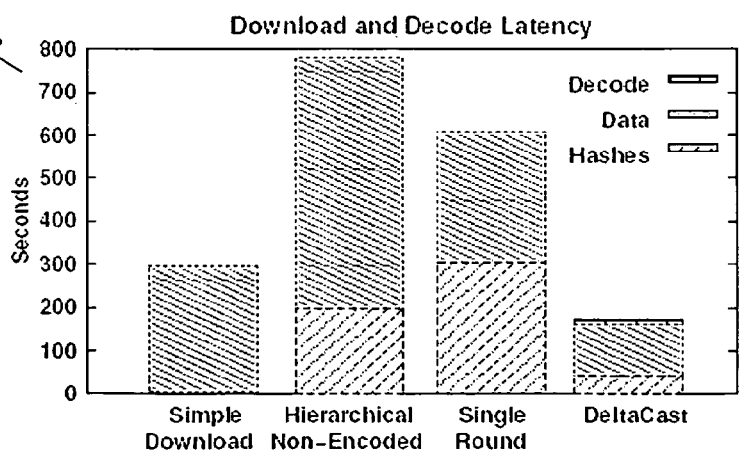

FIG. 13 shows three performance graphs. Graph 440 shows how performance can vary with the number of levels in the hash hierarchy. Graph 442 shows how performance can vary when receivers have different outdated versions of the dataset. Graph 444 shows a comparison of average download latencies for four different schemes: (a) simple full file download with no hashes, (b) hierarchical hashing scheme with no encoded data, (c) single-layer hashing, and (d) hierarchical hashing with erasure encoding ("DeltaCast"). The total latency represented in graph 444 includes (i) the time to download the hashes or the erasure hashes, (ii) the time to download the missing data, (iii) the idle time waiting in the different carrousels for the specific hashes and data to arrive, and (iv) the time to decode the encoded hashes and data. Note that not all latency factors are part of every scheme. For instance, the total latency in scheme (a) is determined by the latency factor (i). The latency in schemes (b) and (c), however, is determined by factors (i), (ii), and (iii), while the latency in scheme (d) is determined by factors (i), (ii), and (iv).

FIG. 14 shows a table 470 of empirical results for different download methods. As can be seen in FIG. 14, the "DeltaCast" approach offers significant performance improvement over other techniques. Three sub-columns represent three different sets of synchronized data. In each case, the "DeltaCast" was superior. These findings also indicate an improvement in power or battery consumption.

SUMMARY

Various embodiments discussed herein may involve reconstructing a master dataset at a receiver. However, there may be some applications where actual reconstruction is not needed or performed and data blocks of the master dataset (or encodings thereof) may not be sent and/or received. For example, there may be cases where it is useful to simply determine where a target dataset differs from a master dataset. Stale data in the target dataset could be deleted from the target dataset to cause the target dataset to become a proper subset of the master dataset. Or, if the master dataset is known to differ only by deletions, then the target dataset could be rendered equivalent to the master dataset by deleting portions determined to be absent from the master dataset. It should also be noted that embodiments discussed herein are highly useful for one-way sender-receiver communication. However, aspects of the embodiments may also be useful for two-way communication systems. For example, a receiver could determine missing parts of a master dataset in ways discussed herein and then use a feedback communication to the sender to request specific missing parts of the master dataset. In sum, techniques discussed herein are useful with but not limited to one-way communication systems.

Those skilled in the art will realize that storage devices utilized to store program instructions can be distributed across a network. For example a remote computer may store an example of the process described as software. A local or terminal computer may access the remote computer and download a part or all of the software to run the program. Alternatively the local computer may download pieces of the software as needed, or distributively process by executing some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Those skilled in the art will also realize that a variety of well-known types of computing systems, networks, and hardware devices, such as workstations, personal computers, PDAs, mobile devices, and so on, may be used to perform embodiments discussed herein. Such systems and their typical components such as CPUs, memory, storage devices, network interfaces, etc. are well known and detailed description thereof is unnecessary and omitted.

The invention claimed is:

1. A method of generating update information for a dataset, the method comprising:

generating, by a processor, a hash hierarchy based on the dataset, wherein the hash hierarchy includes a plurality of levels, and wherein a top level of the hash hierarchy comprises first hashes of first level subdivisions of the dataset, and wherein each subsequent level of the hash hierarchy comprises hashes of subdivisions of next higher level subdivisions of the dataset;

generating, by the processor, erasure hashes based on one of the plurality of levels of the hash hierarchy, wherein each erasure hash is produced by crossing a vector of coefficients with a matrix of a portion of the hashes of the one of the plurality of levels of the hash hierarchy; and repeatedly broadcasting the erasure hashes to a receiver that is configured to compute a subset of the portion of the hashes that is unknown to the receiver based on the received erasure hash and its corresponding coefficients and another subset of the portion of the hashes that is known to the receiver.

2. A method according to claim 1, wherein the erasure hashes comprise linear combinations of at least a portion of the hashes of the one of the plurality of levels of the hash hierarchy.

3. A method according to claim 1, the method further comprising:
generating encodings of the hashes of the one of the plurality of levels of the hash hierarchy; and
repeatedly broadcasting the encodings.

4. A method according to claim 1, wherein the subdivisions are variable sized blocks.

5. A method according to claim 4, wherein the variable sized blocks have a border identifiable by a fingerprint value.

6. A method according to claim 1, wherein the generating a hash hierarchy is performed using at least a homomorphic hashing function.

7. A method according to claim 1, wherein the generating erasure hashes is performed using at least a homomorphic hashing function.

8. A method according to claim 1, wherein the erasure hashes are decomposable.

9. At least one computer-readable storage storing computer executable instructions that, when executed by a processor of a sending device, cause the sending device to perform a process comprising:
generating a hash hierarchy based on the dataset, wherein the hash hierarchy includes a plurality of levels, and wherein a top level of the hash hierarchy comprises first hashes of first level subdivisions of the dataset, and wherein each subsequent level of the hash hierarchy comprises hashes of subdivisions of next higher level subdivisions of the dataset;
generating erasure hashes based on one of the plurality of levels of the hash hierarchy, wherein each erasure hash is produced by crossing a vector of coefficients with a matrix of a portion of the hashes of the one of the plurality of levels of the hash hierarchy; and
repeatedly broadcasting the erasure hashes, wherein a receiver of a broadcast erasure hash is configured to compute a subset of the portion of the hashes that is unknown to the receiver based on the received erasure hash and its corresponding coefficients and a subset of the portion of the hashes that is known to the receiver.

10. At least one computer-readable storage according to claim 9, wherein the erasure hashes comprise linear combinations of at least a portion of the hashes of the one of the plurality of levels of the hash hierarchy.

11. At least one computer-readable storage according to claim 10, the process further comprising:
generating encodings of the hashes of the one of the plurality of levels of the hash hierarchy; and
repeatedly broadcasting the encodings.

12. At least one computer-readable storage according to claim 10, wherein the erasure hashes are decomposable.

13. At least one computer-readable storage according to claim 9, wherein the generating a hash hierarchy is performed using at least a homomorphic hashing function.

14. At least one computer-readable storage according to claim 9 wherein the generating erasure hashes is performed using at least a homomorphic hashing function.

15. At least one computer-readable storage storing computer-executable instructions that, when executed by a processor of a receiving device, cause the receiving device to perform a process comprising:
receiving first hashes of first level subdivisions of a dataset, wherein a top level of a hash hierarchy comprises the first hashes, and wherein the hash hierarchy includes a plurality of levels, and wherein each subsequent level of the hash hierarchy comprises hashes of subdivisions of next higher level subdivisions of the dataset;
receiving erasure hashes that are based on one of the plurality of levels of the hash hierarchy, wherein each erasure hash is produced by crossing a vector of coefficients with a matrix of a portion of the hashes of the one of the plurality of levels of the hash hierarchy;
computing a subset of the portion of the hashes that is unknown to the receiving device based on the received erasure hash and its corresponding coefficients and a subset of the portion of the hashes that is known to the receiving device.

16. At least one computer-readable storage according to claim 15, wherein all of the hashes are the same size.

17. At least one computer-readable storage according to claim 15, further comprising constructing a copy of the master dataset at the receiving device based at least on the computing.

18. At least one computer-readable storage according to claim 15, wherein the erasure hashes are decomposable.

19. At least one computer-readable storage according to claim 15, wherein the first hashes are received via a first communication channel, and wherein the erasure hashes are received via a second communication channel.

20. At least one computer-readable storage according to claim 15, wherein the subdivisions are of varying length.

* * * * *